United States Patent Office 2,701,147
Patented Feb. 1, 1955

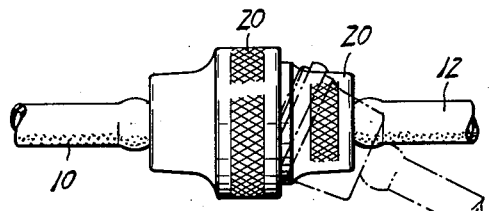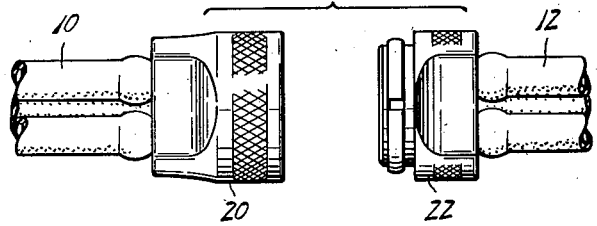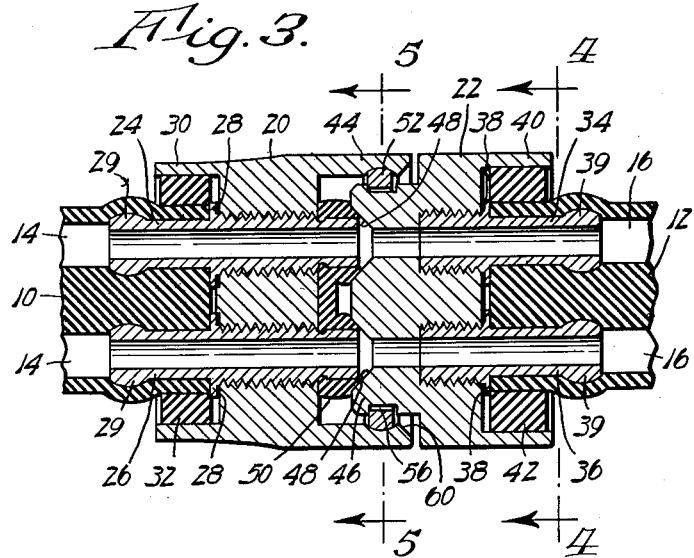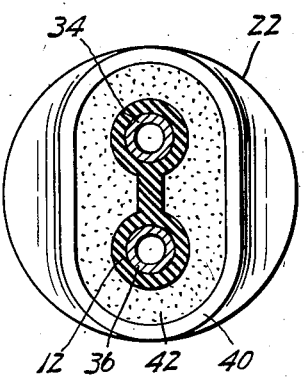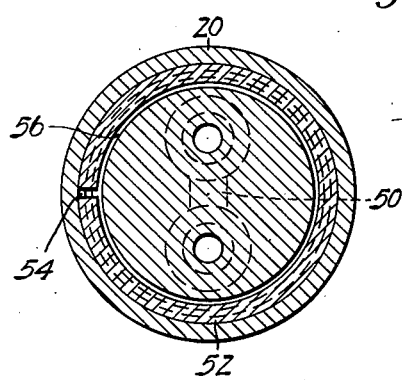
INVENTOR.
Donald V. Summerville
BY
Bean, Brooks, Buckley & Bean.
Attorneys.

2,701,147

QUICK-RELEASE CONDUIT CONNECTION

Donald V. Summerville, Fort Erie, Ontario, Canada, assignor to Aeromat Products Company, Inc., Buffalo, N. Y.

Application February 26, 1949, Serial No. 78,610

7 Claims. (Cl. 285—84)

This invention relates to quickly releasing conduit connection devices, and more particularly to "come-a-part" connection devices such as are useful in conjunction with conduits conveying fluids or compressed air or the like from permanent fixtures to jettisonable apparatus. For example, in aircraft "come-a-part" conduit connection devices find several useful applications, such as in connection with compression suits worn by high altitude flyers, which suits require constant supplies of compressed air. Another application in aircraft is in connection with jettisonable extra fuel tanks and the like.

In the case of the compression or "G" suit application it is of course essential that the aircraft personnel be able to leave the aircraft in case of emergency, either by diving through an opened canopy or by being ejected from the aircraft by a special ejection apparatus. In any case it is of course desirable to relieve the pilot from the necessity of first disconnecting any apparatus tending to keep him attached to the aircraft, such as compressed air conduits leading to the compression suit he is wearing. Also, it is highly desirable that the "come-a-part" connection device is designed to automatically disconnect in response to pull thereon by the pilot's body when leaving the aircraft. The device should be arranged so as not to disconnect solely in response to pressures of the fluid within the conduit system, while at the same time being susceptible of easy and complete disconnection in response to pulling upon the lines in any direction from externally thereof. Also, it is desirable in such devices that the disconnection operation be effected with equal facility in response to pulls upon the conduits in any direction radially of the direction of extension of the conduit.

It is a primary object of the present invention to provide an improved quick disconnect device for conduit systems and the like of the character referred to hereinabove.

It is a more specific object of the invention to provide a device of the character referred to which embodies improvements in construction whereby to guard against leakages of the conducted fluid.

Another object of the invention is to provide an improved apparatus of the character described which is of improved construction whereby to guard against accidental detachment of the conduit members from the disconnect fitting.

Another object of the invention is to provide in an apparatus of the character described an improved form of multiple conduit connection means.

Other objects and advantages of the invention will appear from the specification hereinafter.

In the drawing:

Fig. 1 is a fragmentary side elevation of a conduit system incorporating a disconnect device of the invention, showing by means of broken lines the relative positions of the parts under disconnecting conditions;

Fig. 2 is a disassembled view of the device of Fig. 1, showing the parts in disconnected condition;

Fig. 3 is a longitudinal section, on an enlarged scale, through the device of Fig. 1;

Fig. 4 is a section along line IV—IV of Fig. 3; and

Fig. 5 is a section along line V—V of Fig. 3.

The invention is illustrated in the drawing in connection with a duplex conduit system, comprising a flexible hose 10—12 each of which embody dual bores 14—16, respectively. However, it will be understood that the invention is applicable with equal facility to hose devices having one or any other number of passageways therethrough. The quick disconnect coupling device of the invention is illustrated to comprise body members 20—22 formed of any suitable material. The member 20 is longitudinally bored and tapped to accommodate in screwthreaded relation therein a pair of nipples 24—26 which are longitudinally dimensioned so as to extend at each end beyond the body of the member 20 and in line with the passageways 14—14 within the conduit member 10. The nipples 24—26 are formed with annular shoulders 28 for positioning the nipples within the member 20. At their outer ends the nipples 24—26 are formed with bulbous end portions 29 over which the elastic conduit structure 10 must be stretched in order to slidefit the conduit onto the nipples into the fully engaged position thereof as shown in Fig. 3. At its rear face the member 20 is formed with an annular rim 30, and the parts are so dimensioned and arranged that a substantial space is provided between the rim 30 and the material of the conduit 10 when the latter is in mounted relation upon the nipples 24—26. A rubber ring 32 is press-fitted into the space between the rim 30 and the mounted end portion of the conduit 10 inside of the bulbous portions 29—29 of the nipple members. Particular attention is called to the fact that the ring 32 is longitudinally dimensioned and the bulbous portions 29 of the nipple members are longitudinally located so that whenever there is any pull upon the conduit 10 tending to pull the latter out of connection with the member 20, the ring member 32 is thereby dragged along with the conduit member and tends to roll and thereby increases its thickness dimension. This jams the gap between the rim 30 and the bulbous portion thereby effectively locking the conduit 10 relative to the member 20 against accidental disengagement. However, upon application of a suitable tool the conduit member may be readily disconnected for servicing purposes.

The body member 22 is similarly bored to receive in screwthreaded relation a pair of nipples 34—36 which correspond to the nipples 24—26 of the body member 20. These members also are formed with flanges 38 and bulbous end portions 39 upon which the end of the conduit 12 is slipfitted. Member 22 is also formed with a rim portion 40, thereby providing an annular chamber surrounding the inner end of the conduit 12 when mounted upon the nipples 34—26. A rubber ring 42 is provided to fill the chamber so as to lock the conduit in connection upon the member 22, as in the manner of the operation of the ring 32 in connection with the member 20.

The inner end of the member 20 is formed with an extending rim portion 44 which is dimensioned to encircle an inwardly extending end portion 46 formed at the inner end of the member 22 when the parts are arranged in assembled relation. Furthermore, the inner end portion 46 of the member 22 is conically counterbored as indicated at 48—48 in alignment with the fluid passageways formed therethrough; and the parts are so dimensioned and arranged that when the members 20—22 are in assembled relation the counterbore portions 48—48 of the member 22 enclose and seat against the inwardly extending end portions of the nipples 24—26 of the body member 20. A resilient gasket member 50 is provided to comprise a pair of circular gasket portions slipfitted over the inner ends of the nipples 24—26 so as to engage the conical seat portions 48—48 of the member 22 in fluid sealing relation.

The connection locking mechanism of the device comprises a split ring member 52 which is cut as indicated at 54 (Fig. 5) and preset to a diameter greater than the diameter of the inner surface of the rim portion 44 of the body member 20. The inner extending end portion 46 of the body member 22 is annularly grooved as indicated at 56 to accommodate the locking ring 52 therein, and the inner wall of the rim portion 44 of the body member 20 is formed with an annular recess of concave sectional form to complement the curvature of the outer face of the ring 52; the outer face of the ring 52 being crowned in section as shown in Fig. 3.

Thus, it will be appreciated that the ring 52 snaps into position to lock the members 20—20 together with the conical seat portions 48—48 in fluid sealing abutting relation against the gasket 50, when the parts are pressed together; and that normal fluid pressures from internally of the device tend merely to displace the members 20—22 in directions axially of the conduit system, thereby being successfully resisted by the locking ring 52 which fully occupies the gap between the grooved portions of the members 20—22. However, upon deflection of the members 20—22 out of axial alignment with one another the locking ring 52 functions at a fulcrum at one side thereof, and all of the deflecting force is concentrated on the opposite side of the locking ring 52, resulting in forcing the latter to contract by being cammed against the concave recess portion of the rim of the body member 20. This contraction of the locking ring 52 results in freeing of the connection between the members 20—22, whereupon they readily pull apart; and it will be appreciated that this disconnection operation will obtain regardless of which radial direction the deflection force is applied. Also, it will be understood that a sufficiently strong pull upon one of the conduit members, even in straight axial direction, will similarly result in contraction of the locking ring 52, whereby the parts will become disconnected. As illustrated at 60, the inner end of the flange portion 44 is preferably conically counterbored so as to facilitate guiding of the locking ring 52 into the bore of the flange 44 and compression of the ring in connection with each assembly operation. Also, this facilitates relative rocking of the members 20—22 for improved come-a-part operation. Abutting action between the adjacent corners of the members 20—22 further assists such rocking and come-a-part operation, as well as guaranteeing proper relative positioning of the parts upon assembly.

Thus, it will be appreciated that if for example in an aircraft the member 20 be permanently attached to a fixed portion of the aircraft, and the member 22 be connected as shown in the drawing to one end of a flexible conduit coming away from the pilot's compression suit, for example, the connection will normally resist the internal pressures of the compressed air supply being furnished through the system; but if the pilot leaves his seat for any reason whatsoever the flexible hose portion attached to his suit is pulled upon at some angle relative to the axial direction of the device, whereupon the quick disconnection operation referred to hereinabove is obtained. Therefore, the pilot need pay no attention to the mechanism other than to make certain that the parts are connected together when he becomes settled in his seat preliminary to a flight operation. Then, if later on a condition of emergency exists his mind is free to cope with other more important phases of the operation, and if and when he decides to leave the aircraft he simply stands up and leaves his seat whereupon the parts come apart without difficulty or attention on the part of the pilot. As explained hereinabove, it is a particular feature and advantage of the invention that the conduit devices 10—12 are relatively locked upon the nipple devices of the members 20—22 by means of the automatically self-locking rings 32—42; and thus, it is assured that the device disconnects at the desired point instead of at other portions of the conduit connection system.

Although only one form of the invention has been shown and described in detail, it will be apparent to those skilled in the art that the invention is not so limited but that various changes may be made therein without departing from the spirit of the invention or the scope of the appended claims.

I claim:

1. In a conduit coupling device, a body member bored and fitted at one end with a nipple device to extend therefrom to receive a flexible conduit when press fitted thereon, said extending nipple device being externally swelled at its outer end to cause said conduit to swell to larger dimension thereat when press fitted thereon, said body member having an integral substantially cylindrical outstanding rim portion encircling said nipple device short of the region of the swelled portion thereof, and a rubber ring of substantially rectangular cross section being slip fitted into the space between said rim portion and said conduit when assembled on said nipple device inwardly of said swelled end thereof whereby pulling on said conduit will cause said rubber ring to twist substantially about its neutral axis to thereby increase its thickness dimension and to automatically lock said conduit to said nipple device.

2. In a conduit coupling device, a body member bored and fitted at one end with a nipple device to extend therefrom to receive a flexible conduit when press fitted thereon, said extending nipple device being externally shouldered at its outer end to cause said conduit to swell to larger dimension thereat when press fitted thereon, said body member having an outstanding substantially cylindrical rim portion encircling said nipple device short of the region of the shouldered portion thereof, and a rubber ring of substantially rectangular cross section being slip-fitted into the space between said rim portion and said nipple device inwardly of said swelled end thereof for locking said conduit thereon.

3. In a conduit coupling device, a body member bored and fitted at one end with a nipple device to extend therefrom to receive a flexible conduit when press fitted thereon, said extending nipple device being externally shouldered at its outer end to cause said conduit to swell to larger dimension thereat when press fitted thereon, said body member having an outstanding rim portion encircling said nipple device short of the region of the shouldered portion thereof, and an elastically compressible ring being slip-fitted into the space between said rim portion and said nipple device inwardly of said shouldered end thereof for locking said conduit thereon.

4. In a conduit coupling device, a body member having a nipple device extending integrally therefrom to receive a flexible conduit when press fitted thereon, said extending nipple device being externally shouldered at its outer end to cause said conduit to swell to larger dimension thereat when press fitted thereon, said body member having an outstanding rim portion encircling said nipple device short of the region of the shouldered portion thereof, and a compressible elastic ring being slip-fitted over said conduit to span the space between said rim member and said conduit member in the region inwardly of said shouldered portion of said nipple for locking said conduit thereon.

5. In a quick disconnect conduit mechanism, a pair of body members bored in alignment and having their adjacent bore portions abutting for fluid transmission purposes, said members having coextensive first rim portions relatively spaced radially of said mechanism, each of said rim portions being recessed to accommodate therebetween an elastic ring operable normally to prevent disassociation of the body members, the outer of said rim portions having its groove formed to a concave sectional form, the outer surface of said ring being of rounded sectional form complementing the concave sectional form of said outer rim groove, the inner of said rim portions having its groove formed to a rectangular sectional form, the side wall surfaces of said ring being of parallel straight wall form, and the inner surface of said ring being of straight wall sectional form whereby the side and inner surfaces of said ring complement the rectangular sectional form of said inner rim groove, the outer of said rim portions having its end counterbored conically to permit relative rocking of said body members for assembly and disassembly purposes the bore of one of said body members being fitted with a nipple device extending therefrom away from said first rim portion to receive a flexible conduit when press fitted thereon, said nipple device being externally shouldered at its outer end to cause said conduit to swell thereat when press fitted thereon, said one of said body members having a second rim portion spaced from and encircling said nipple device, and elastically compressible ring means of substantially rectangular cross section being slip-fitted within the space between said second rim portion and said nipple device and inwardly of the shouldered portion of said nipple device for automatically locking said conduit thereon.

6. In combination, with the structure outlined in claim 1, a second similar body member from which a second nipple device projects on both sides, detachable connection means for said body members, and a flexible material sealing gasket fitted over a projecting nipple portion of said second nipple device and seated into the aligned nipple bore of said first body member in assembled relation with said second body member.

7. In a quick disconnect mechanism, the structure outlined in claim 2 in combination with a second body member bored and fitted with a second nipple device, the said second nipple device projecting from both ends of said second body member and having one projecting outer end thereof externally swelled to cause a second joining conduit to swell to larger dimensions when press fitted thereon, said second body member having an integral substantially cylindrical outstanding second rim portion encircling said second nipple device short of the region of said swelled portion, a second rubber ring of substantially rectangular cross section being slip fitted into the space between said second rim portion and said second nipple device for automatically locking the said second conduit thereon, a flexible material sealing gasket snugly fitted over said second nipple device projection oppostie the swelled end thereof, and split ring retention means between said first and second body members the nipple bores of which are in alignment in assembled locked relation, the said sealing gasket carried by said second body member nipple device being fitted into a countersink bored into the adjoining nipple bore of the said first body member.

References Cited in the file of this patent

UNITED STATES PATENTS

| | | |
|---|---|---|
| 89,373 | Abbott | Apr. 27, 1869 |
| 744,634 | Silvis | Nov. 17, 1903 |
| 769,248 | Brainard | Sept. 6, 1904 |
| 1,481,341 | Bersted | Jan. 22, 1924 |
| 1,703,696 | Stratford | Feb. 26, 1929 |
| 1,837,888 | Schnaier | Dec. 22, 1931 |
| 1,896,687 | Johnson | Feb. 7, 1933 |
| 1,915,552 | Shindel | June 27, 1933 |
| 2,099,722 | Byers | Nov. 23, 1937 |
| 2,413,106 | Kelle | Dec. 24, 1946 |
| 2,433,602 | Coss | Dec. 30, 1947 |
| 2,438,679 | Parker | Mar. 30, 1948 |
| 2,455,544 | Yonkers | Dec. 7, 1948 |
| 2,479,499 | Le Clair | Aug. 16, 1949 |
| 2,538,683 | Guiler | Jan. 16, 1951 |
| 2,578,933 | Hunter et al. | Dec. 18, 1951 |

FOREIGN PATENTS

| | | |
|---|---|---|
| 325,814 | Great Britain | Feb. 27, 1930 |
| 543,733 | Great Britain | Mar. 10, 1942 |